US010419097B2

(12) United States Patent
Yao et al.

(10) Patent No.: US 10,419,097 B2
(45) Date of Patent: Sep. 17, 2019

(54) CSI RECEIVING METHOD AND ACCESS NETWORK DEVICE

(71) Applicant: HUAWEI TECHNOLOGIES CO., LTD., Shenzhen, Guangdong (CN)

(72) Inventors: Saijie Yao, Shenzhen (CN); Na Deng, Shenzhen (CN); Yuanjie Li, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/021,356

(22) Filed: Jun. 28, 2018

(65) Prior Publication Data

US 2018/0309491 A1 Oct. 25, 2018

Related U.S. Application Data

(63) Continuation of application No. PCT/CN2016/113154, filed on Dec. 29, 2016.

(30) Foreign Application Priority Data

Dec. 31, 2015 (CN) .......................... 2015 1 1033084

(51) Int. Cl.
*H04B 7/06* (2006.01)
*H04W 72/08* (2009.01)
(Continued)

(52) U.S. Cl.
CPC ......... *H04B 7/0626* (2013.01); *H04L 5/0035* (2013.01); *H04L 5/0053* (2013.01);
(Continued)

(58) Field of Classification Search
CPC ......... H04W 72/0426; H04W 72/0413; H04W 72/04; H04W 72/08; H04B 7/0626; H04L 5/0035; H04L 5/0053; H04L 5/0055
(Continued)

(56) References Cited

U.S. PATENT DOCUMENTS 6,628,631 B1 * 9/2003 Mazawa ............... H04W 36/02
370/331
2005/0048979 A1 * 3/2005 Chun ....................... H04L 5/023
455/443

(Continued)

FOREIGN PATENT DOCUMENTS

| CN | 101394378 A | 3/2009 |
|---|---|---|
| CN | 101888665 A | 11/2010 |
| CN | 102884748 A | 1/2013 |
| CN | 103858505 A | 6/2014 |
| WO | 2015018068 A1 | 2/2015 |

*Primary Examiner* — Emmanuel Bayard
(74) *Attorney, Agent, or Firm* — Womble Bond Dickinson (US) LLP

(57) ABSTRACT

The present disclosure discloses a method of receiving channel state information (CSI) and an access network device, so as to resolve a technical problem that timely scheduling cannot be implemented due to a relatively long time required for transmitting CSI in a D-RAN architecture. The method includes: receiving, by a first access network device, a notification message sent by a second access network device, where the notification message is used to indicate condition information based on which a terminal device camping on a first cell of the second access network device sends CSI; and receiving, by the first access network device, on a resource determined according to the condition information indicated by the notification message, the CSI sent by the terminal device.

24 Claims, 5 Drawing Sheets

(51) Int. Cl.
  *H04L 5/00* (2006.01)
  *H04W 24/10* (2009.01)
  *H04W 68/00* (2009.01)
  *H04W 72/04* (2009.01)
  *H04W 72/12* (2009.01)

(52) U.S. Cl.
  CPC ............ *H04L 5/0091* (2013.01); *H04W 24/10* (2013.01); *H04W 68/005* (2013.01); *H04W 72/042* (2013.01); *H04W 72/0413* (2013.01); *H04W 72/08* (2013.01); *H04W 72/1289* (2013.01); *H04L 5/0057* (2013.01)

(58) Field of Classification Search
  USPC ................. 375/219–220, 267, 299, 347, 356
  See application file for complete search history.

(56) References Cited

U.S. PATENT DOCUMENTS

| | | | |
|---|---|---|---|
| 2010/0246548 A1* | 9/2010 | Bahng | H04B 7/0452 370/338 |
| 2012/0033624 A1 | 2/2012 | Luo et al. | |
| 2013/0039232 A1* | 2/2013 | Kim | H04L 5/14 370/280 |
| 2013/0051322 A1 | 2/2013 | Barbieri et al. | |
| 2014/0120917 A1* | 5/2014 | Yoshihara | H04W 36/0033 455/436 |
| 2014/0295850 A1* | 10/2014 | Lee | H04W 36/32 455/441 |
| 2015/0098427 A1 | 4/2015 | Barbieri et al. | |
| 2016/0150512 A1 | 5/2016 | Zhang et al. | |

\* cited by examiner

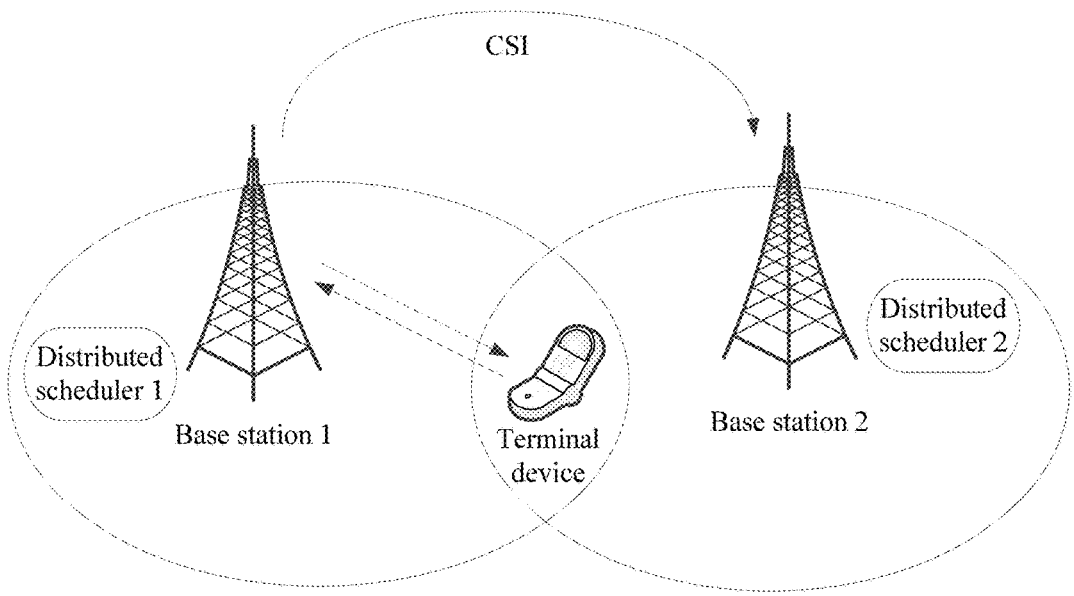

FIG. 1

```
                                                                    201
  A first access network device receives a notification message sent by a
  second access network device, where the notification message is used to
  indicate condition information based on which a terminal device camping
  on a first cell managed by the second access network device sends CSI
```

```
                                                                    202
  The first access network device receives, on a resource determined
  according to the condition information indicated by the notification
       message, the CSI sent by the terminal device
```

FIG. 2

CSI RECEIVING METHOD AND ACCESS NETWORK DEVICE

CROSS-REFERENCE TO RELATED APPLICATIONS

This application is a continuation of International Application No. PCT/CN2016/113154, filed on Dec. 29, 2016, which claims priority to Chinese Patent Application No. 201511033084.X, filed on Dec. 31, 2015, the disclosures of which are incorporated herein by reference.

TECHNICAL FIELD

The present disclosure relates to the communications field, and in particular, to a channel state information (CSI) receiving method and an access network device.

BACKGROUND

To improve frequency utilization efficiency of a Long Term Evolution (LTE) system, a same frequency band is usually used for neighboring cells when an LTE network is deployed. However, in this deployment solution, an edge user throughput decreases sharply due to severe interference between cells. In this case, a coordinated multipoint transmission/reception (CoMP) technology is considered as an effective method for resolving an inter-cell interference problem and improving the edge user throughput. In the CoMP technology, a number of neighboring cells may jointly handle or coordinate edge users to avoid interference and improve the edge user throughput.

In a frequency division duplex (FDD) system, user equipment (UE) needs to compute channel state information (CSI), and feed back the CSI to a serving cell. After receiving the CSI that is fed back by the UE, the serving cell transmits the CSI to a scheduler. Then, the scheduler performs scheduling according to collected information.

In a distributed radio access network (D-RAN) architecture, a corresponding distributed scheduler is disposed on a base station to which each cooperating cell used in CoMP belongs. Therefore, the distributed scheduler not only needs to receive information transmitted by a base station served by the distributed scheduler, but also needs to receive information transmitted by a base station to which another cooperating cell belongs, so that joint scheduling can be implemented. In this case, each cooperating cell needs to send the received information (such as CSI) to all other cooperating cells, and then each cooperating cell transmits the received information to a distributed scheduler serving the cooperating cell, so that joint scheduling can be implemented. However, in the D-RAN architecture, a radio network is usually used as a backhaul network (that is, a network between base stations), and a delay is relatively long, that is, a backhaul delay is non-ideal. As a result, the time required for transmitting CSI in the D-RAN architecture increases, and timely scheduling cannot be implemented.

SUMMARY

This disclosure provides a CSI receiving method and an access network device, so as to resolve a technical problem that timely scheduling cannot be implemented due to a relatively long time required for transmitting CSI in a D-RAN architecture.

According to a first aspect, a CSI receiving method is provided, including:

receiving, by a first access network device, a notification message sent by a second access network device, where the notification message is used to indicate condition information based on which a terminal device camping on a first cell managed by the second access network device sends CSI; and receiving, by the first access network device, on a resource determined according to the condition information indicated by the notification message, the CSI sent by the terminal device.

A serving cell can notify a cooperating cell of the condition information based on which the terminal device sends the CSI, so that the cooperating cell can receive, according to the known condition information, the CSI sent by the terminal device. This way, the cooperating cell can also receive the CSI sent by a terminal device in another cell, without requiring forwarding by the serving cell. This reduces the time required for forwarding between cells, thereby reducing the time required for transmitting the CSI. The cooperating cell can directly transmit the received CSI to a distributed scheduler serving the cooperating cell, so that joint scheduling can be implemented in a timely manner.

In one embodiment, if the terminal device sends periodic CSI by using an uplink control channel, the notification message is used to indicate at least one of a feedback cycle of the periodic CSI, an offset, a reporting mode of the periodic CSI, or a location of a resource occupied for sending the periodic CSI by the terminal device; or if the terminal device sends periodic CSI by using an uplink shared channel, the notification message is used to indicate at least one of a feedback cycle of the periodic CSI, an offset, a reporting mode of the periodic CSI, uplink scheduling information used by the second access network device to schedule the terminal device, or a difference between a coding rate used by the periodic CSI and a coding rate used by uplink data, or the notification message is used to indicate at least one of a feedback cycle of the periodic CSI, an offset, a reporting mode of the periodic CSI, a location of a resource occupied for sending the periodic CSI by the terminal device, or a difference between a coding rate used by the periodic CSI and a coding rate used by uplink data.

According to different channels used for sending the periodic CSI by the terminal device, the notification message may have different indications, so that the first access network device can accurately receive the periodic CSI sent by the terminal device.

In another embodiment, the difference between the coding rate used by the periodic CSI and the coding rate used by the uplink data includes:

a difference between a coding rate used by a channel quality indicator (CQI)/precoding matrix indicator (PMI) of the periodic CSI and the coding rate used by the uplink data; and/or a difference between a coding rate used by a rank indication (RI) of the periodic CSI and the coding rate used by the uplink data.

A manner of determining the coding rate used by the periodic CSI is provided.

In yet another embodiment, the notification message is used to indicate at least one of a coding rate used by aperiodic CSI, a reporting mode of the aperiodic CSI, or that a resource used for sending the aperiodic CSI by the terminal device is a resource indicated by downlink control information; or the notification message is used to indicate at least one of a coding rate used by the aperiodic CSI, a reporting mode of the aperiodic CSI, or that a resource used for sending the aperiodic CSI by the terminal device is a resource indicated by uplink grant information.

If the terminal device sends the aperiodic CSI, the notification message may have different indications according to different resources used for sending the aperiodic CSI by the terminal device, so that the first access network device can accurately receive the aperiodic CSI sent by the terminal device.

In still another embodiment, the coding rate used by the aperiodic CSI is the same as a coding rate used by uplink data.

A manner of determining the coding rate used by the aperiodic CSI is provided.

According to a second aspect, another CSI receiving method is provided, including:

sending, by a second access network device to which a first cell that a terminal device camps on belongs, request information to the terminal device, where the request information is used to request the terminal device to send CSI to the second access network device; and sending, by the second access network device, a notification message to a first access network device to which a second cell belongs, where the notification message is used to indicate condition information based on which the terminal device sends the CSI.

A serving cell can request a terminal device to send CSI, and can also notify a cooperating cell of condition information based on which the terminal device sends the CSI, so that the cooperating cell can receive, according to the known condition information, the CSI sent by the terminal device. This way, the cooperating cell can also receive the CSI sent by a terminal device in another cell, without requiring forwarding by the serving cell. This reduces a time required for forwarding between cells, thereby reducing the time required for transmitting the CSI. The cooperating cell can directly transmit the received CSI to a distributed scheduler serving the cooperating cell, so that joint scheduling can be implemented in a timely manner.

In one embodiment, if the request information is used to request the terminal device to send periodic CSI to the second access network device, the request information is carried in radio resource control signaling; or if the request information is used to request the terminal device to send aperiodic CSI to the second access network device, the request information is carried in downlink control information, or the request information is carried in a random access response message.

The request information may have different implementations according to different CSI sent by the terminal device.

In another embodiment, the request information is used to request the terminal device to send the aperiodic CSI to the second access network device; and if the request information is carried in the downlink control information, the notification message is used to indicate at least one of a coding rate used by the aperiodic CSI, a reporting mode of the aperiodic CSI, or that a resource used for sending the aperiodic CSI by the terminal device is a resource indicated by the downlink control information; or if the request information is carried in the random access response message, the notification message is used to indicate at least one of a coding rate used by the aperiodic CSI, a reporting mode of the aperiodic CSI, or that a resource used for sending the aperiodic CSI by the terminal device is a resource indicated by uplink grant information.

The notification message may have different indications according to different implementations of the request information, so that the first access network device can accurately receive the aperiodic CSI.

In yet another embodiment, the coding rate used by the aperiodic CSI is the same as a coding rate used by uplink data.

A method for determining the coding rate of the aperiodic CSI is provided.

In one embodiment, the request information is used to request the terminal device to send the periodic CSI to the second access network device; and if the terminal device sends the periodic CSI by using an uplink control channel, the notification message is used to indicate at least one of a feedback cycle of the periodic CSI, an offset, a reporting mode of the periodic CSI, or a location of a resource occupied for sending the periodic CSI by the terminal device; or if the terminal device sends the periodic CSI by using an uplink shared channel, the notification message is used to indicate at least one of a feedback cycle of the periodic CSI, an offset, a reporting mode of the periodic CSI, uplink scheduling information used by the second access network device to schedule the terminal device, or a difference between a coding rate used by the periodic CSI and a coding rate used by uplink data, or the notification message is used to indicate at least one of a feedback cycle of the periodic CSI, an offset, a reporting mode of the periodic CSI, a location of a resource occupied for sending the periodic CSI by the terminal device, or a difference between a coding rate used by the periodic CSI and a coding rate used by uplink data.

According to different channels used for sending the periodic CSI by the terminal device, the notification message may have different indications, so that the first access network device can accurately receive the periodic CSI sent by the terminal device.

In another embodiment, the difference between the coding rate used by the periodic CSI and the coding rate used by the uplink data includes:

a difference between a coding rate used by a CQI/PMI of the periodic CSI and the coding rate used by the uplink data; and/or a difference between a coding rate used by an RI of the periodic CSI and the coding rate used by the uplink data.

A method for determining the coding rate of the periodic CSI is provided.

In one embodiment, if a delay in sending any message by the second access network device to the first access network device is greater than a first delay, the second access network device sends the request information to the terminal device at a first moment, and the second access network device sends the notification message to the first access network device at a second moment, where the second moment is earlier than the first moment, and the first delay is a delay between sending the request information by the second access network device and sending the CSI by the terminal device; or if a delay in sending any message by the second access network device to the first access network device is less than or equal to a first delay, the second access network device sends the request information to the terminal device at a first moment, and the second access network device sends the notification message to the first access network device at a second moment, where the second moment is equal to the first moment, and the first delay is a delay between sending the request information by the second access network device and sending the CSI by the terminal device.

Impact of a backhaul delay is considered, so as to ensure that when the terminal device sends the CSI, the first access network device can receive the CSI in a timely manner according to a resource indicated by the notification message.

According to a third aspect, a first type of access network device is provided, including:

a first receiver configured to receive a notification message sent by a second access network device, where the notification message is used to indicate condition information based on which a terminal device camping on a first cell managed by the second access network device sends channel state information CSI;

a processor configured to determine, according to condition information indicated by a notification message sent by the terminal device, a resource occupied for sending the CSI by the terminal device; and a second receiver configured to receive, on the resource determined by the processor, the CSI sent by the terminal device.

In one embodiment, if the terminal device sends periodic CSI by using an uplink control channel, the notification message is used to indicate at least one of a feedback cycle of the periodic CSI, an offset, a reporting mode of the periodic CSI, or a location of a resource occupied for sending the periodic CSI by the terminal device; or if the terminal device sends periodic CSI by using an uplink shared channel, the notification message is used to indicate at least one of a feedback cycle of the periodic CSI, an offset, a reporting mode of the periodic CSI, uplink scheduling information used by the second access network device to schedule the terminal device, or a difference between a coding rate used by the periodic CSI and a coding rate used by uplink data, or the notification message is used to indicate at least one of a feedback cycle of the periodic CSI, an offset, a reporting mode of the periodic CSI, a location of a resource occupied for sending the periodic CSI by the terminal device, or a difference between a coding rate used by the periodic CSI and a coding rate used by uplink data.

In another embodiment, the difference between the coding rate used by the periodic CSI and the coding rate used by the uplink data includes:

a difference between a coding rate used by a CQI/PMI of the periodic CSI and the coding rate used by the uplink data; and/or a difference between a coding rate used by an RI of the periodic CSI and the coding rate used by the uplink data.

In still another embodiment, the notification message is used to indicate at least one of a coding rate used by the aperiodic CSI, a reporting mode of the aperiodic CSI, or that a resource used for sending the aperiodic CSI by the terminal device is a resource indicated by downlink control information; or the notification message is used to indicate at least one of a coding rate used by the aperiodic CSI, a reporting mode of the aperiodic CSI, or that a resource used for sending the aperiodic CSI by the terminal device is a resource indicated by uplink grant information.

In yet another embodiment, the coding rate used by the aperiodic CSI is the same as a coding rate used by uplink data.

According to a fourth aspect, a second type of access network device is provided, including:

a first transmitter configured to send request information to a terminal device by using a first cell, where the request information is used to request the terminal device to send channel state information CSI to the access network device, and the terminal device camps on the first cell;

a processor configured to determine condition information based on which the terminal device sends the CSI; and a second transmitter configured to send a notification message to a first access network device to which a second cell belongs, where the notification message is used to indicate the condition information based on which the terminal device sends the CSI and that is determined by the processor.

In one embodiment, if the request information is used to request the terminal device to send periodic CSI to the access network device, the request information is carried in radio resource control signaling; or if the request information is used to request the terminal device to send aperiodic CSI to the access network device, the request information is carried in downlink control information, or the request information is carried in a random access response message.

In another embodiment, the request information is used to request the terminal device to send the aperiodic CSI to the access network device; and if the request information is carried in the downlink control information, the notification message is used to indicate at least one of a coding rate used by the aperiodic CSI, a reporting mode of the aperiodic CSI, or that a resource used for sending the aperiodic CSI by the terminal device is a resource indicated by the downlink control information; or if the request information is carried in the random access response message, the notification message is used to indicate at least one of a coding rate used by the aperiodic CSI, a reporting mode of the aperiodic CSI, or that a resource used for sending the aperiodic CSI by the terminal device is a resource indicated by uplink grant information.

In still another embodiment, the coding rate used by the aperiodic CSI is the same as a coding rate used by uplink data.

In yet another embodiment, the request information is used to request the terminal device to send the periodic CSI to the access network device; and if the terminal device sends the periodic CSI by using an uplink control channel, the notification message is used to indicate at least one of a feedback cycle of the periodic CSI, an offset, a reporting mode of the periodic CSI, or a location of a resource occupied for sending the periodic CSI by the terminal device; or if the terminal device sends the periodic CSI by using an uplink shared channel, the notification message is used to indicate at least one of a feedback cycle of the periodic CSI, an offset, a reporting mode of the periodic CSI, uplink scheduling information used by the access network device to schedule the terminal device, or a difference between a coding rate used by the periodic CSI and a coding rate used by uplink data, or the notification message is used to indicate at least one of a feedback cycle of the periodic CSI, an offset, a reporting mode of the periodic CSI, a location of a resource occupied for sending the periodic CSI by the terminal device, or a difference between a coding rate used by the periodic CSI and a coding rate used by uplink data.

In another embodiment, the difference between the coding rate used by the periodic CSI and the coding rate used by the uplink data includes:

a difference between a coding rate used by a CQI/PMI of the periodic CSI and the coding rate used by the uplink data; and/or a difference between a coding rate used by an RI of the periodic CSI and the coding rate used by the uplink data.

In still another embodiment, if a delay in sending any message by the access network device to the first access network device is greater than a first delay, the first transmitter sends the request information to the terminal device at a first moment, and the second transmitter sends the notification message to the first access network device at a second moment, where the second moment is earlier than the first moment, and the first delay is a delay between sending the request information by the access network device and sending the CSI by the terminal device; or if a delay in sending any message by the access network device to the first access network device is less than or equal to a first delay, the first transmitter sends the request information to the terminal device at a first moment, and the second transmitter sends the notification message to the first access network device at a second moment, where the second moment is equal to the first moment, and the first delay is a delay between sending the request information by the access network device and sending the CSI by the terminal device.

According to a fifth aspect, a third type of access network device is provided, where the access network device includes a module configured to execute the method in the first aspect.

According to a sixth aspect, a fourth type of access network device is provided, where the access network device includes a module configured to execute the method in the second aspect.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 1 is a schematic diagram showing that CSI is transmitted in a D-RAN architecture;

FIG. 2 is a flowchart of a first CSI receiving method according to an embodiment of the present disclosure;

DESCRIPTION OF EMBODIMENTS

Figure 3:
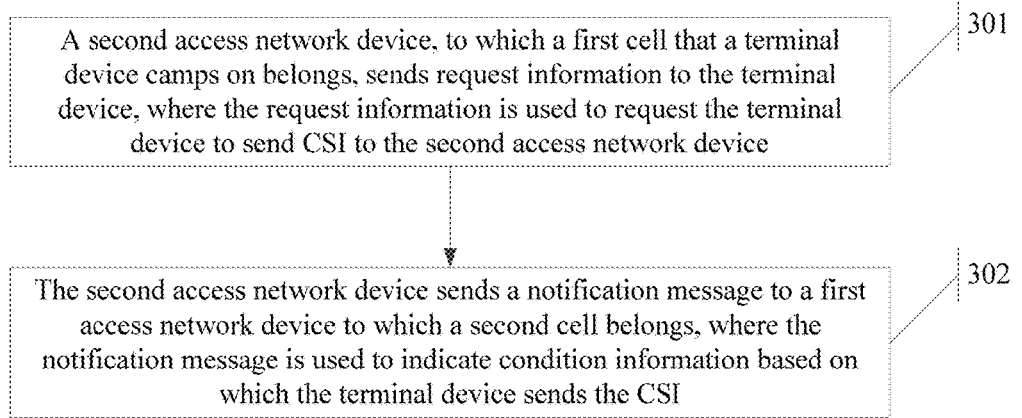
FIG. 3 is a flowchart of a second CSI receiving method according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The solutions in the embodiments of the present disclosure may be applied to an existing mobile communications system, such as an LTE system, a $5^{th}$ generation mobile communications system (5G), or another such communications system.

The following describes some terms in the embodiments of the present disclosure for ease of understanding by a person skilled in the art.

(1) A terminal device is a device that provides voice and/or data connectivity for a user, including, for example, a handheld device with a wireless connection function or a processing device connected to a wireless modem. The terminal device may communicate with a core network through a radio access network (RAN), and exchange voice and/or data with the RAN. The terminal device may include UE, a wireless terminal device, a mobile terminal device, a subscriber unit, a subscriber station, a mobile station, a remote station, an access point (AP), a remote terminal device, an access terminal device, a user terminal device (or user terminal), a user agent, a user device, and the like. For example, the terminal device may be a mobile phone (or referred to as a "cellular" phone), a computer with a mobile terminal device, or a portable, pocket-sized, handheld, computer built-in, or in-vehicle mobile apparatus. For example, the terminal device may be a device such as a personal communications service (PCS) phone, a cordless telephone set, a Session Initiation Protocol (SIP) phone, a wireless local loop (WLL) station, or a personal digital assistant (PDA).

(2) An access network device, for example, a base station (such as an access point), may be a device that communicates, by using one or more sectors, with a wireless terminal device over an air interface in an access network. The base station may be configured to convert a received radio frame and an Internet Protocol (IP) packet, and serve as a router between the wireless terminal device and a rest part of the access network. The rest part of the access network may include an IP network. The base station may also coordinate attribute management of the air interface. For example, the base station may be a radio network controller (RNC) or a base station controller (BSC), or may be an evolved base station (NodeB, eNB, e-NodeB, or evolved Node B) in an LTE-Advanced system (LTE-A). This is not limited in the embodiments of the present disclosure.

(3) A CoMP technology is considered as an effective method for resolving a problem of interference between cells and improving an edge user throughput. In the CoMP technology, a number of neighboring cells may jointly handle or coordinate edge users to avoid interference and improve the edge user throughput. A downlink CoMP technology mainly includes joint transmission (JT), coordinated scheduling and beamforming (CS/CB), and dynamic point selection/dynamic point blanking (DPS/DPB). JT is further divided into coherent JT and incoherent JT. An uplink CoMP technology mainly includes joint reception (JR), CS, and DPS/DPB.

(4) The terms "system" and "network" in the embodiments of the present disclosure may be used interchangeably. "A plurality of" means at least two. "And/or" describes an association relationship between associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

The technical solutions provided in the embodiments of the present disclosure may be applied to a CoMP scenario in a D-RAN architecture, or may be applied to any other possible scenario. For example, in an LTE system, when an access network device has a requirement, the access network device may notify another access network device of information that a terminal device sends CSI, so that the other access network device can directly receive the CSI sent by the terminal device.

The following describes a CoMP application scenario in a D-RAN architecture.

Referring to FIG. 1, FIG. 1 is a schematic diagram of a possible scenario that CSI is transmitted in a D-RAN architecture. For example, in a CoMP technology, two cooperating cells are used. The two cooperating cells belong to a base station 1 and a base station 2 in FIG. 1 respectively, and a terminal device camps on a cell of the base station 1. The base station 1 sends a CSI request to the terminal device (as shown by a dashed-line arrow in FIG. 1). The terminal device estimates CSI corresponding to all CSI processes, and then feeds back the estimated CSI to a serving cell (that is, the cell of the base station 1), as shown by a solid-line arrow in FIG. 1. The serving cell sends all the received CSI to a cooperating cell (that is, a cell of the base station 2 in FIG. 1). For example, the serving cell may send the CSI by using an X2 interface between the base stations. In addition, the serving cell also needs to send the received CSI to a distributed scheduler (that is, a distributed scheduler 1 in FIG. 1). After obtaining the CSI, the cooperating cell transmits the CSI to a distributed scheduler (that is, a distributed scheduler 2 in FIG. 1), so that the distributed scheduler 1 and the distributed scheduler 2 compute scheduling information to implement joint scheduling.

Generally, the base station 1 and the base station 2 communicate with each other in a wireless manner. That is, a backhaul delay in sending CSI by the serving cell to the cooperating cell is non-ideal. As a result, a transmission time of the CSI is excessively long, leading to a problem that real-time scheduling cannot be implemented.

To resolve the problem, according to an embodiment of the present disclosure, the serving cell notifies the cooperating cell of information that the terminal device sends CSI, so that the cooperating cell can receive, according to the known information, the CSI sent by the terminal device. This way, the cooperating cell can also receive CSI sent by a terminal device in another cell, without requiring forwarding by the serving cell. This reduces the time required for forwarding between cells, thereby reducing the time required for transmitting the CSI. The cooperating cell can directly transmit the received CSI to a distributed scheduler serving the cooperating cell, so that joint scheduling can be implemented in a timely manner.

The following describes methods in the embodiments of the present disclosure with reference to the accompanying drawings.

Referring to FIG. 2, an embodiment of the present disclosure provides a first CSI receiving method. A procedure for the method is described as follows.

At 201, a first access network device receives a notification message sent by a second access network device, where the notification message is used to indicate condition information based on which a terminal device camping on a first cell managed by the second access network device sends CSI.

At 202, the first access network device receives, on a resource determined according to the condition information indicated by the notification message, the CSI sent by the terminal device.

Referring to FIG. 3, an embodiment of the present disclosure provides a second CSI receiving method. A procedure for the method is described as follows.

At 301, a second access network device, to which a first cell that a terminal device camps on belongs, sends request information to the terminal device, where the request information is used to request the terminal device to send CSI to the second access network device.

At 302, the second access network device sends a notification message to a first access network device to which a second cell belongs, where the notification message is used to indicate condition information based on which the terminal device sends the CSI.

The following describes an application scenario of this embodiment of the present disclosure by using CoMP in a D-RAN architecture as an example. For example, the first access network device and the second access network device work in the D-RAN architecture, and the second cell and the first cell serve the terminal device in a CoMP manner. A sequence of performing step 301 and step 302 may depend on a non-ideal backhaul delay in the D-RAN architecture.

In one embodiment, the method shown in FIG. 2 and the method shown in FIG. 3 are correlated, and the following describes the methods together.

In actual application, a number of cells in the D-RAN architecture may serve the terminal device in a CoMP manner, and a cell that the terminal device camps on is a serving cell of the terminal device. For example, an access network device to which the serving cell of the terminal device belongs is referred to as the second access network device, and another cell serving the terminal device in a CoMP manner is a cooperating cell. There may be a number of cooperating cells, and the first access network device may be, for example, an access device to which any one cooperating cell belongs. For the cooperating cells, manners of receiving CSI are similar. Therefore, in this embodiment of the present disclosure, the manner of receiving CSI is described by using one cooperating cell as an example.

Figure 4:
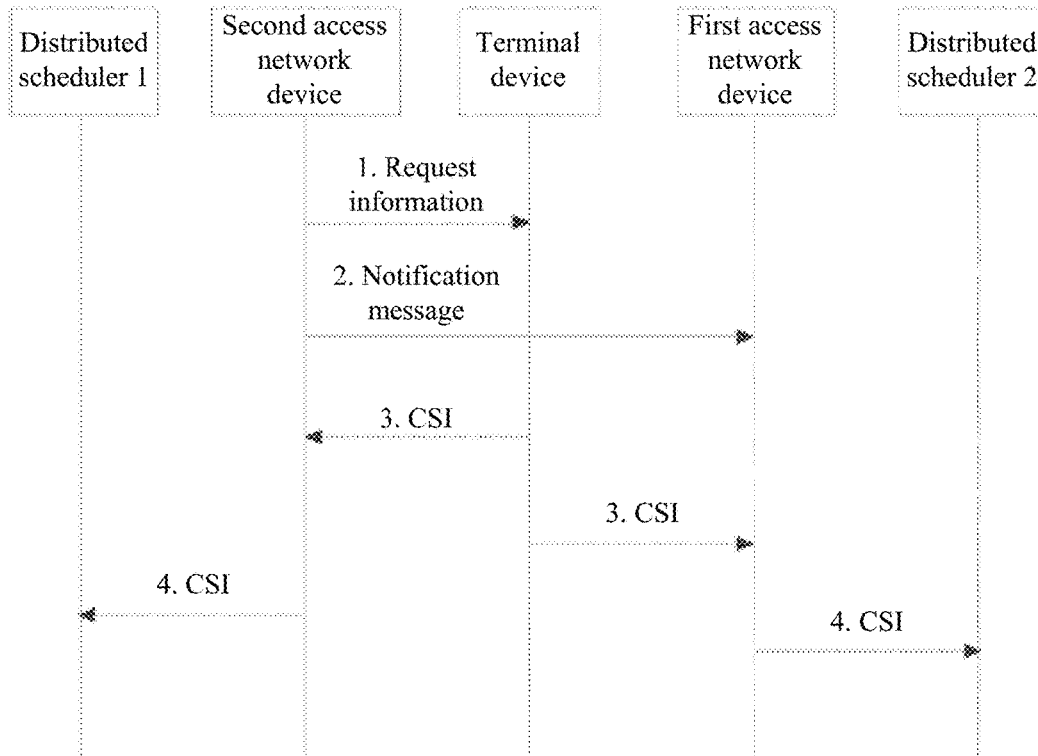
FIG. 4 is a schematic interaction diagram of a CSI receiving method according to an embodiment of the present disclosure.

Referring to FIG. 4, FIG. 4 shows a detailed CSI receiving method based on FIG. 2 and FIG. 3.

1. The second access network device sends request information to the terminal device, where the request information is used to request the terminal device to report CSI to a serving cell. For example, the request information may be used to request the terminal device to report aperiodic CSI to the serving cell, or may be used to request the terminal device to report periodic CSI to the serving cell. An access network device to which the serving cell belongs is the second access network device.

In one embodiment, when the CSI requested by the request information is different, implementations of the request information may be different. The following separately provides description.

(1) The request information is used to request the terminal device to send periodic CSI to the second access network device.

In this case, the request information may be implemented by using radio resource control (RRC) signaling. For example, the request information may be carried in the RRC signaling, and the request information may be implemented by using one or more fields in the RRC signaling. For example, the second access network device may send, to the terminal device by using a physical downlink shared channel (PDSCH), the RRC signaling carrying the request information.

(2) The request information is used to request the terminal device to send aperiodic CSI to the second access network device.

In one embodiment, the request information may be implemented by using a CSI field in downlink control information (DCI). That is, the request information may be carried in the DCI, and in this case, a DCI format may be, for example, a DCI format zero (0) or four (4). For example, the request information may occupy one or more bits in the CSI field, and the request information is used to indicate whether the terminal device reports the aperiodic CSI to the second access network device in corresponding uplink transmission. In addition, the DCI is used to indicate a resource used for sending the CSI by the terminal device.

In one embodiment, the request information may alternatively be implemented by using a CSI request field in uplink grant information of a random access response (RAR). That is, the request information may alternatively be carried in the RAR. Generally, uplink grant information in DCI has a one-bit CSI request field. For non-contention-based random access, the CSI request field in the RAR is used to determine whether the aperiodic CSI is included in corresponding uplink transmission. For contention-based random access, the CSI request field in the RAR is usually reserved, that is, it does not have any effect. Therefore, in this embodiment of the present disclosure, if the RAR carrying the request information is for non-contention-based random access, the request information may be implemented directly by using the CSI request field in the RAR; or if the RAR carrying the request information is for contention-based random access, the request information may be implemented by using the reserved CSI request field. Likewise, the request information is used to indicate whether the terminal device reports the aperiodic CSI to the second access network device in corresponding uplink transmission. In addition, the uplink grant information is used to indicate a resource used for sending the CSI by the terminal device.

2. In addition to sending the request information to the terminal device, the second access network device may further send a notification message to the first access network device, where the notification message is used to indicate condition information based on which the terminal device sends CSI.

There may be a number of condition information based on which the terminal device sends the CSI. According to different CSI sent by the terminal device, the condition information based on which the terminal device sends the CSI may include different content, that is, the notification message may be used to indicate different information.

For example, for the aperiodic CSI, if the request information is carried in downlink control information, the notification message may be used to indicate at least one of a coding rate used by the aperiodic CSI, a reporting mode of the aperiodic CSI, or that a resource used for sending the aperiodic CSI by the terminal device is a resource indicated by the downlink control information. If the request information is carried in the random access response, the notification message may be used to indicate at least one of a coding rate used by the aperiodic CSI, a reporting mode of the aperiodic CSI, or that a resource used for sending the aperiodic CSI by the terminal device is a resource indicated by uplink grant information.

In one embodiment, the reporting mode of the aperiodic CSI may be used to indicate a feedback status of a precoding matrix indicator (PMI), for example, no PMI is fed back, a single PMI is fed back, or a number of PMIs are fed back. In addition, the reporting mode of the aperiodic CSI may further be used to indicate that a channel quality indicator (CQI) measured by the terminal device is obtained by way of a measurement performed on all bandwidths, a measurement performed on a subband selected by the terminal device, or a measurement performed on a subband configured by a higher layer. If the channel quality indicator is obtained by means of a measurement performed on a subband, the reporting mode of the aperiodic CSI may further be used to indicate the specific subband. This way, after receiving the notification message, the first access network device can accurately receive the CSI sent by the terminal device.

In one embodiment, the coding rate of the aperiodic CSI is consistent with a coding rate of uplink data. That is, it may be considered that there is no difference between the coding rate used by the aperiodic CSI and the coding rate used by the uplink data.

For example, the notification message may include a flag bit of one or more bits. The flag bit may be used to indicate information that the terminal device sends aperiodic CSI. For example, the notification message may include a flag bit of two bits. When a value of the two bits is 01, the flag bit is used to indicate that a resource used for sending the CSI by the terminal device is a resource indicated by a DCI format 0. When a value of the two bits is 10, the flag bit is used to indicate that a resource used for sending the CSI by the terminal device is a resource indicated by a DCI format 4. When a value of the two bits is 11, the flag bit is used to indicate that a resource used for sending the CSI by the terminal device is a resource indicated by uplink grant information. Alternatively, the coding rate used by the aperiodic CSI and the reporting mode of the aperiodic CSI may be indicated by using another flag bit or in another manner.

Certainly, if the terminal device sends aperiodic CSI, the notification message may alternatively indicate, in another manner, condition information based on which the terminal device sends the CSI, for example, may indicate more information by using more bits. This is not limited in this embodiment of the present disclosure.

For aperiodic CSI, the terminal device may send the aperiodic CSI by using an uplink shared channel. For example, the uplink shared channel may include a physical uplink shared channel (Physical Uplink Shared Channel, PUSCH). For periodic CSI, although request information may all be carried in RRC signaling, the terminal device may send the periodic CSI by using different channels. For example, the terminal device may send the periodic CSI by using an uplink control channel, where the uplink control channel may include a physical uplink control channel (PUCCH) or another uplink control channel. Alternatively, the terminal device may send the periodic CSI by using an uplink shared channel, where the uplink shared channel may include a PUSCH or another uplink shared channel.

Therefore, if the terminal device sends the periodic CSI by using an uplink control channel, the notification message may be used to indicate at least one of a feedback cycle of the periodic CSI, an offset, a reporting mode of the periodic CSI, or a location of a resource occupied for sending the periodic CSI by the terminal device. If the terminal device sends the periodic CSI by using an uplink shared channel, the notification message may be used to indicate at least one of a feedback cycle of the periodic CSI, an offset, a reporting mode of the periodic CSI, uplink scheduling information used by the second access network device to schedule the terminal device to send the periodic CSI, or a difference between a coding rate used by the periodic CSI and a coding rate used by uplink data. If the terminal device sends the periodic CSI by using an uplink shared channel, the notification message may be used to indicate at least one of a feedback cycle of the periodic CSI, an offset, a reporting mode of the periodic CSI, a location of a resource occupied for sending the periodic CSI by the terminal device, or a difference between a coding rate used by the periodic CSI and a coding rate used by uplink data.

In one embodiment, a feedback cycle and an offset of a CQI/PMI may usually depend on $I_{CQI/PMI}$, where $I_{CQI/PMI}$ may be referred to as, for example, a CQI/PMI configuration index parameter (also referred to as "ConfigIndex"). A feedback cycle and an offset of a rank indication (RI) may usually depend on $I_{RI}$, where $I_{RI}$ may be referred to as, for example, an RI configuration index parameter.

In one embodiment, the reporting mode of the periodic CSI may be used to indicate a PMI feedback status, for example, no PMI is fed back, or a single PMI is fed back. In addition, the reporting mode of the periodic CSI may be further used to indicate that a CQI measured by the terminal device is obtained by means of a measurement performed on all bandwidths or a measurement performed on a subband selected by the terminal device. If the CQI is obtained by way of a measurement performed on a subband, the reporting mode of the periodic CSI may be further used to indicate the specific subband. This way, after receiving the notification message, the first access network device can accurately receive the CSI sent by the terminal device.

In one embodiment, there is a difference between the coding rate used by the periodic CSI and the coding rate used by the uplink data. For example, the difference between the coding rate used by the periodic CSI and the coding rate used by the uplink data may include: a difference between a coding rate used by a CQI/PMI of the periodic CSI and the coding rate used by the uplink data, and/or a difference between a coding rate used by an RI of the periodic CSI and the coding rate used by the uplink data.

In one embodiment, the difference between the coding rate used by the CQI/PMI of the periodic CSI and the coding rate used by the uplink data is represented as, for example, $\beta_{offset}^{CQI}$, and the difference between the coding rate used by the RI of the periodic CSI and the coding rate used by the uplink data is represented as, for example, $\beta_{offset}^{RI}$.

In addition, in an FDD system, there is a delay between sending request information by the second access network device and sending CSI by the terminal device, and the delay is referred to as, for example, a first delay. In this embodiment, the second access network device sends a notification message to the first access network device, so that the first access network device can receive the CSI sent by the terminal device. Therefore, if a non-ideal backhaul delay (a backhaul delay may be understood as a delay in sending any message by the second access network device to the first access network device) is less than or equal to the first delay, a moment at which the second access network device sends the notification message to the first access network device may be the same as a moment at which the second access network device sends the request information to the terminal device. If a non-ideal backhaul delay is greater than the first delay, a moment at which the second access network device sends the notification message to the first access network device needs to be earlier than a moment at which the second access network device sends the request information to the terminal device, to ensure that when the terminal device sends the CSI, the first access network device can receive the CSI in a timely manner according to a resource indicated by the notification message.

Figure 5:
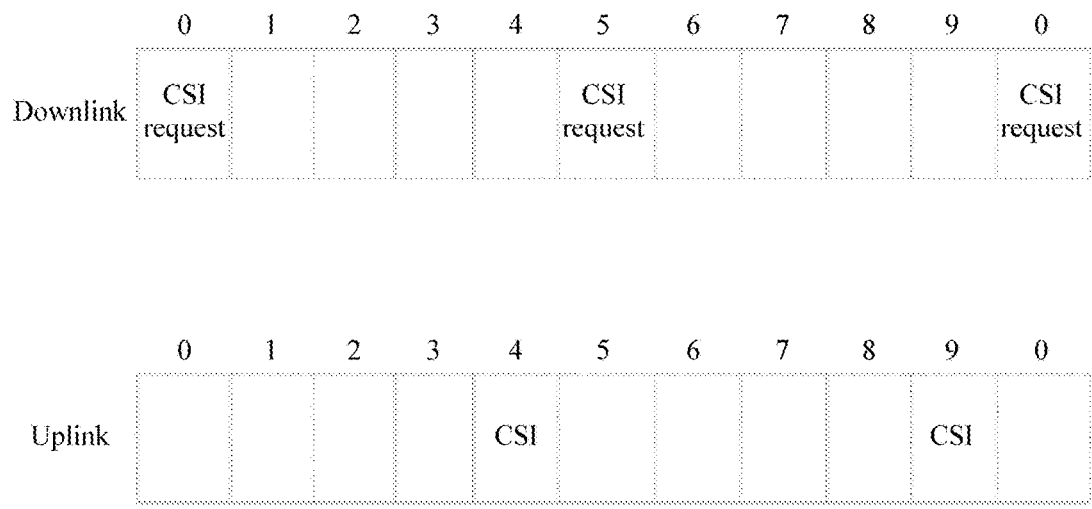
FIG. 5 is a schematic diagram of a delay in sending CSI by a terminal device according to an embodiment of the present disclosure.

For example, referring to FIG. 5, in an FDD system, the second access network device sends a CSI request (that is, the request information in this embodiment of the present disclosure) to the terminal device at an $n^{th}$ moment, and the terminal device feeds back CSI to the second access network device at an $(n+4)^{th}$ moment, that is, the first delay is 4 milliseconds (ms). If a non-ideal backhaul delay is less than or equal to 4 ms, a moment at which the second access network device sends a notification message to the first access network device may be the same as the moment at which the second access network device sends the request information to the terminal device. If a non-ideal backhaul delay is greater than 4 ms, a moment at which the second access network device sends a notification message to the first access network device needs to be earlier than the moment at which the second access network device sends the request information to the terminal device.

3. The second access network device and the first access network device receive, according to a resource scheduled for transmitting the CSI by the terminal device, the CSI reported by the terminal device.

4. The second access network device sends, to a distributed scheduler (a distributed scheduler 1 in FIG. 4) serving the second access network device, the CSI reported by the terminal device. The first access network device sends, to a distributed scheduler (a distributed scheduler 2 in FIG. 4) serving the first access network device, the CSI reported by the terminal device. A delay on a network between an access network device and a corresponding distributed scheduler may be considered as zero or quite small, and therefore can be ignored.

Each distributed scheduler computes scheduling information according to received CSI, to implement joint scheduling.

In addition, arrow locations in FIG. 4 do not represent an actual performing order of the steps.

According to the methods provided in this embodiment, a serving cell and a cooperating cell in the D-RAN architecture can obtain CSI from all CSI processes almost simultaneously at a determined time-frequency resource. This avoids a transmission delay introduced when CSI is exchanged between base stations over an X2 interface (or CSI is exchanged in another manner, for example, by using a core network device), so that joint scheduling can be implemented in a timely manner in the D-RAN architecture, and better performance is achieved by the CoMP technology in the D-RAN architecture.

The following introduces devices provided in the embodiments of the present disclosure with reference to accompanying drawings.

Figure 6:
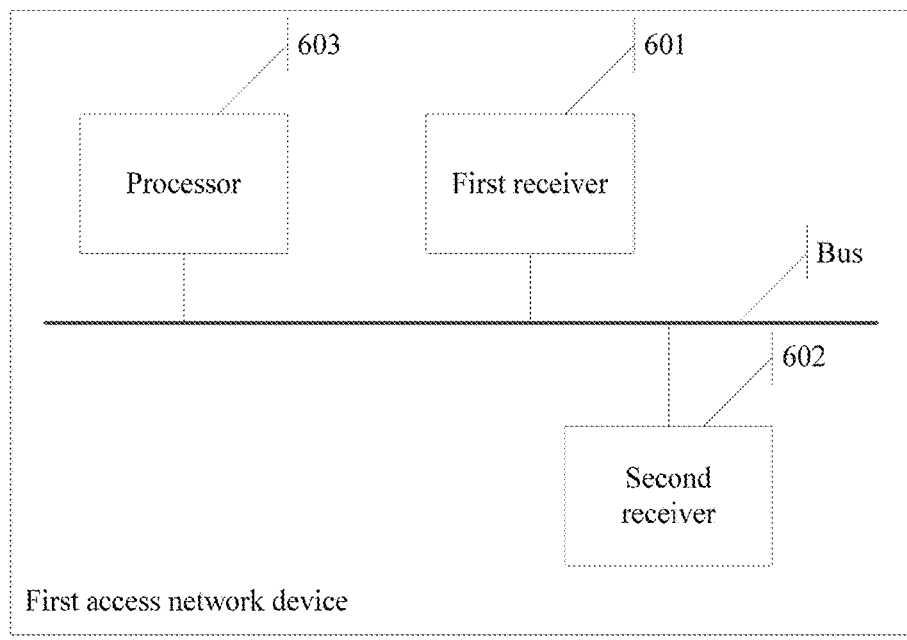
FIG. 6 is a schematic structural diagram of a first access network device according to an embodiment of the present disclosure.

Referring to FIG. 6, based on the same concept, an embodiment of the present disclosure provides a first type of access network device. The access network device may include a first receiver 601, a second receiver 602, and a processor 603.

The processor 603 may include a central processing unit (CPU) or an application-specific integrated circuit (ASIC); or may include one or more integrated circuits configured to control program execution, which may be a hardware circuit developed by using a field programmable gate array (FPGA), or a baseband chip.

The first receiver 601 and the second receiver 602 are configured to perform network communication with an external device. The first receiver 601 is configured to communicate with another access network device, for example, communicate with the other access network device over an X2 interface or by using a core network device. The second receiver 602 is configured to communicate with a terminal device, for example, by using a network such as an Ethernet, a radio access network, or a wireless local access network.

The first receiver 601 and the second receiver 602 may be connected to the processor 603 by using a bus (this is used as an example in FIG. 6) or separately connected to the processor 603 by using a dedicated connection cable.

The processor 603 is designed and programmed to embed code corresponding to the aforementioned methods into a chip, so that when running, the chip can execute the methods shown in FIG. 2 and FIG. 4. The design and programming of the processor 603 are generally well known to a person skilled in the art, and for brevity sake, the details of the design and programming are not described herein.

The access network device may be configured to execute the methods in FIG. 2 and FIG. 4, for example, may be the aforementioned first access network device. Therefore, for functions implemented by the units of the access network device, refer to the descriptions in the method part, and details are not further described.

Figure 7:
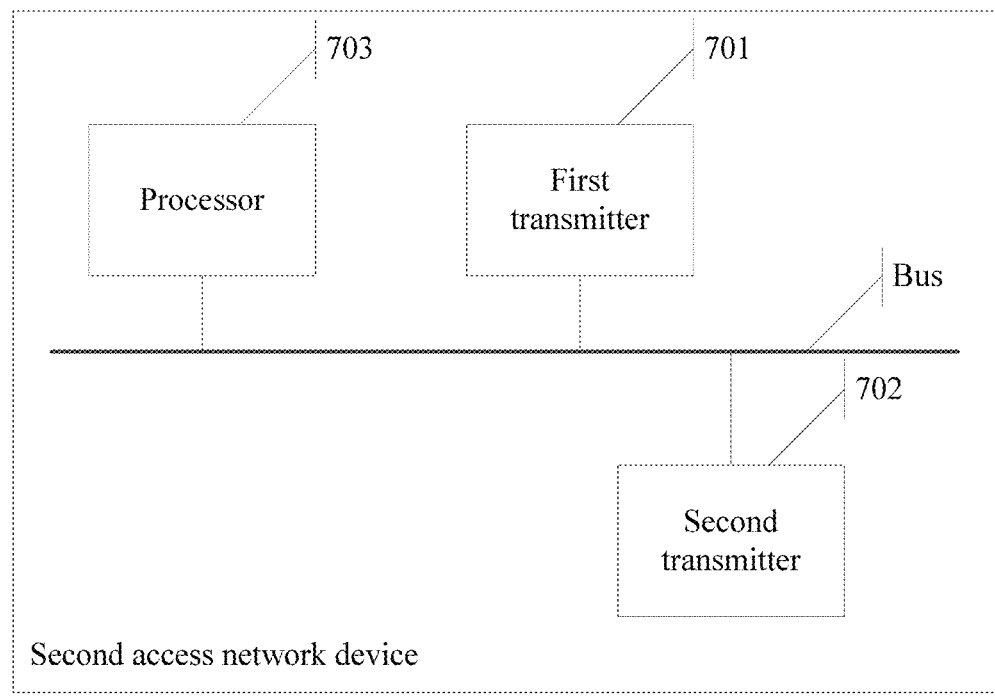
FIG. 7 is a schematic structural diagram of a second access network device according to an embodiment of the present disclosure.

Referring to FIG. 7, based on the same concept, an embodiment of the present disclosure provides a second type of access network device. The access network device may include a first transmitter 701, a second transmitter 702, and a processor 703.

The processor 703 may include a CPU or an ASIC; or may include one or more integrated circuits configured to control program execution, which may be a hardware circuit developed by using an FPGA, or a baseband chip.

The first transmitter 701 and the second transmitter 702 are configured to perform network communication with an external device. The first transmitter 701 is configured to communicate with a terminal device, for example, communicate with a terminal device by using a network such as an Ethernet, a radio access network, or a wireless local access network. The second transmitter 702 is configured to communicate with another access network device, for example, communicate with the other access network device over an X2 interface or by using a core network device.

The first transmitter 701 and the second transmitter 702 may be connected to the processor 703 by using a bus (this is used as an example in FIG. 7) or separately connected to the processor 703 by using a dedicated connection cable.

The processor 703 is designed and programmed to embed code corresponding to the aforementioned methods into a chip, so that when running, the chip can execute the methods shown in FIG. 3 and FIG. 4. The design and programming of the processor 703 are generally well known to a person skilled in the art, and for brevity sake, the details of the design and programming are not described herein.

The access network device may be configured to execute the methods in FIG. 3 and FIG. 4, for example, may be the aforementioned second access network device. Therefore, for functions implemented by the units of the access network device, refer to the descriptions in the method part, and details are not further described.

Figure 8:
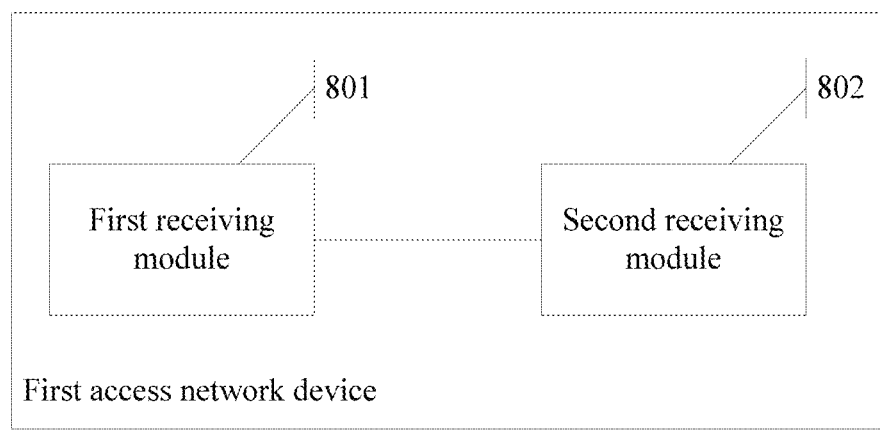
FIG. 8 is a structural block diagram of a first access network device according to an embodiment of the present disclosure.

Referring to FIG. 8, based on the same concept, an embodiment of the present disclosure provides a third type of access network device. The access network device may include a first receiving module 801 and a second receiving module 802.

In actual application, an entity device corresponding to the first receiving module 801 may be the first receiver 601 in FIG. 6, and an entity device corresponding to the second receiving module 802 may be the second receiver 602 in FIG. 6. Certainly, in actual application, the access network device may further include a processing module, not shown in FIG. 8, corresponding to the processor 603 in FIG. 6.

The access network device may be configured to execute the methods in FIG. 2 and FIG. 4, for example, may be the aforementioned first access network device. Therefore, for functions implemented by the units of the access network device, refer to the descriptions in the method part, and details are not further described.

Figure 9:
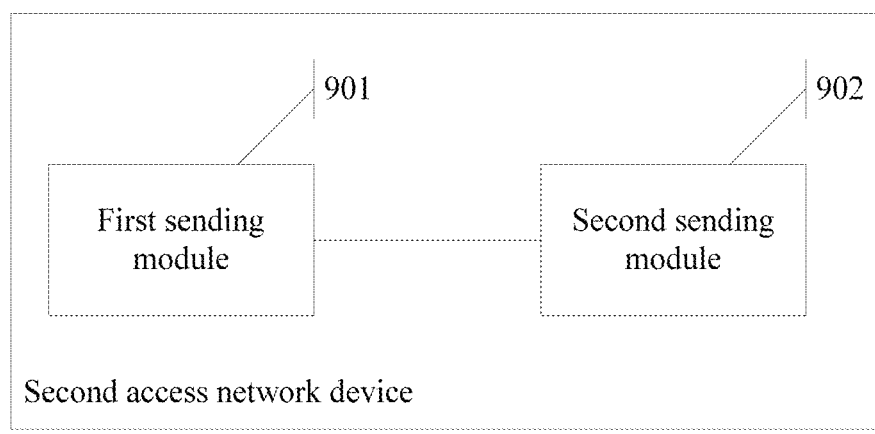
FIG. 9 is a structural block diagram of a second access network device according to an embodiment of the present disclosure.

Referring to FIG. 9, based on the same concept, an embodiment of the present disclosure provides a fourth type of access network device. The access network device may include a first sending module 901 and a second sending module 902.

In actual application, an entity device corresponding to the first sending module 901 may be the first transmitter 701 in FIG. 7, and an entity device corresponding to the second sending module 902 may be the second transmitter 702 in FIG. 7. Certainly, in actual application, the access network device may further include a processing module, not shown in FIG. 9, corresponding to the processor 703 in FIG. 7.

The access network device may be configured to execute the methods in FIG. 2 and FIG. 3, for example, may be the aforementioned second access network device. Therefore, for functions implemented by the units of the access network device, refer to the descriptions in the method part, and details are not further described.

In the embodiments of the present disclosure, a serving cell notifies a cooperating cell of condition information based on which a terminal device sends CSI, so that the cooperating cell can receive, according to the known condition information, the CSI sent by the terminal device. This way, the cooperating cell can also receive CSI sent by a terminal device in another cell, without requiring forwarding by the serving cell. This reduces a time required for forwarding between cells, thereby reducing the time required for transmitting the CSI. The cooperating cell can directly transmit the received CSI to a distributed scheduler serving the cooperating cell, so that joint scheduling can be implemented in a timely manner.

In the present disclosure, it should be understood that the disclosed device and method may be implemented in other manners. For example, the described apparatus embodiment is merely an example. For example, the unit or unit division is merely logical function division and may be other division in actual implementation. For example, a plurality of units or components may be combined or integrated into another system, or some features may be ignored or not performed.

In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. A part or all of the units may be selected according to actual needs to achieve the embodiments of the present disclosure.

Functional units in the embodiments of the present disclosure may be integrated into one processing unit, or each of the units may exist alone physically.

When the integrated unit is implemented in the form of a software functional unit and sold or used as an independent product, the integrated unit may be stored in a computer-readable storage medium. Based on such an understanding, all or a part of technical solutions of the present disclosure may be implemented in a form of a software product. The computer software product is stored in a storage medium and includes several instructions for instructing a computer device (which may be a personal computer, a server, a network device, or the like) or a processor to perform all or a part of the steps of the methods described in the embodiments of the present disclosure. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing embodiments are merely used to describe the technical solutions of the present disclosure in detail. The foregoing embodiment descriptions are merely intended to help understand the method of the embodiments of the present disclosure, and shall not be construed as a limitation on the embodiments of the present disclosure. Any variation or replacement readily figured out by a person skilled in the art shall fall within the protection scope of the embodiments of the present disclosure.

What is claimed is:

1. A method of receiving channel state information (CSI), comprising:
   receiving, by a first access network device, a notification message used to indicate condition information and sent by a second access network device, wherein a terminal device camping on a first cell managed by the second access network device sends CSI based on the condition information; and
   receiving, by the first access network device, on a resource determined according to the condition information indicated by the notification message.

2. The method according to claim 1, wherein
   if the terminal device sends periodic CSI by using an uplink control channel, the notification message is used to indicate at least one of a feedback cycle of the periodic CSI, an offset, a reporting mode of the periodic CSI, or a location of a resource occupied for sending the periodic CSI by the terminal device; or
   if the terminal device sends the periodic CSI by using an uplink shared channel, the notification message is used to indicate at least one of a feedback cycle of the periodic CSI, an offset, a reporting mode of the periodic CSI, uplink scheduling information used by the second access network device to schedule the terminal device, or a difference between a coding rate used by the periodic CSI and a coding rate used by uplink data, or the notification message is used to indicate at least one of a feedback cycle of the periodic CSI, an offset, a reporting mode of the periodic CSI, a location of a resource occupied for sending the periodic CSI by the terminal device, or the difference between the coding rate used by the periodic CSI and the coding rate used by the uplink data.

3. The method according to claim 2, wherein the difference between the coding rate used by the periodic CSI and the coding rate used by the uplink data comprises:
   a difference between a coding rate used by a channel quality indicator (CQI) or a precoding matrix indicator (PMI) of the periodic CSI and the coding rate used by the uplink data; or
   a difference between a coding rate used by a rank indication (RI) of the periodic CSI and the coding rate used by the uplink data.

4. The method according to claim 1, wherein
   the notification message is used to indicate at least one of a coding rate used by aperiodic CSI, a reporting mode of the aperiodic CSI, or that a resource used for sending the aperiodic CSI by the terminal device is a resource indicated by downlink control information; or
   the notification message is used to indicate at least one of a coding rate used by the aperiodic CSI, a reporting mode of the aperiodic CSI, or that a resource used for sending the aperiodic CSI by the terminal device is a resource indicated by uplink grant information.

5. The method according to claim 4, wherein the coding rate used by the aperiodic CSI is the same as a coding rate used by uplink data.

6. A method of receiving channel state information (CSI), comprising:
   sending, by a second access network device associated with a first cell that a terminal device camps on, request information to the terminal device, wherein the request information is used to request the terminal device to send CSI to the second access network device; and
   sending, by the second access network device, a notification message used to indicate condition information to a first access network device associated with a second cell, wherein the terminal device sends the CSI based on the condition information.

7. The method according to claim 6, wherein
   if the request information is used to request the terminal device to send periodic CSI to the second access network device, the request information is carried in radio resource control signaling; or
   if the request information is used to request the terminal device to send aperiodic CSI to the second access network device, the request information is carried in downlink control information, or the request information is carried in a random access response message.

8. The method according to claim 7, wherein the request information is used to request the terminal device to send the aperiodic CSI to the second access network device; and
   if the request information is carried in the downlink control information, the notification message is used to indicate at least one of a coding rate used by the aperiodic CSI, a reporting mode of the aperiodic CSI, or that a resource used for sending the aperiodic CSI by the terminal device is a resource indicated by the downlink control information; or
   if the request information is carried in the random access response message, the notification message is used to indicate at least one of a coding rate used by the aperiodic CSI, a reporting mode of the aperiodic CSI, or that a resource used for sending the aperiodic CSI by the terminal device is a resource indicated by uplink grant information.

9. The method according to claim 8, wherein the coding rate used by the aperiodic CSI is the same as a coding rate used by uplink data.

10. The method according to claim 7, wherein the request information is used to request the terminal device to send the periodic CSI to the second access network device; and if the terminal device sends the periodic CSI by using an uplink control channel, the notification message is used to indicate at least one of a feedback cycle of the periodic CSI, an offset, a reporting mode of the periodic CSI, or a location of a resource occupied for sending the periodic CSI by the terminal device; or if the terminal device sends the periodic CSI by using an uplink shared channel, the notification message is used to indicate at least one of a feedback cycle of the periodic CSI, an offset, a reporting mode of the periodic CSI, uplink scheduling information used by the second access network device to schedule the terminal device, or a difference between a coding rate used by the periodic CSI and a coding rate used by uplink data, or the notification message is used to indicate at least one of a feedback cycle of the periodic CSI, an offset, a reporting mode of the periodic CSI, a location of a resource occupied for sending the periodic CSI by the terminal device, or the difference between the coding rate used by the periodic CSI and the coding rate used by the uplink data.

11. The method according to claim 10, wherein the difference between the coding rate used by the periodic CSI and the coding rate used by the uplink data comprises:

a difference between a coding rate used by a channel quality indicator (CQI) or a precoding matrix indicator (PMI) of the periodic CSI and the coding rate used by the uplink data; or a difference between a coding rate used by a rank indication (RI) of the periodic CSI and the coding rate used by the uplink data.

12. The method according to claim 6, wherein if a delay in sending any message by the second access network device to the first access network device is greater than a first delay, the second access network device sends the request information to the terminal device at a first moment, and the second access network device sends the notification message to the first access network device at a second moment, wherein the second moment is earlier than the first moment, and the first delay is a delay between sending the request information by the second access network device and sending the CSI by the terminal device; or if a delay in sending any message by the second access network device to the first access network device is less than or equal to a first delay, the second access network device sends the request information to the terminal device at a first moment, and the second access network device sends the notification message to the first access network device at a second moment, wherein the second moment is equal to the first moment, and the first delay is a delay between sending the request information by the second access network device and sending the CSI by the terminal device.

13. An access network device, comprising:
a first receiver configured to receive a notification message used to indicate condition information and sent by a second access network device, wherein a terminal device camping on a first cell managed by the second access network device sends channel state information (CSI) based on the condition information;

a processor configured to determine, according to the condition information indicated by the notification message sent by the terminal device, a resource occupied for sending the CSI by the terminal device; and a second receiver configured to receive, on the resource determined by the processor, the CSI sent by the terminal device.

14. The access network device according to claim 13, wherein if the terminal device sends periodic CSI by using an uplink control channel, the notification message is used to indicate at least one of a feedback cycle of the periodic CSI, an offset, a reporting mode of the periodic CSI, or a location of a resource occupied for sending the periodic CSI by the terminal device; or if the terminal device sends periodic CSI by using an uplink shared channel, the notification message is used to indicate at least one of a feedback cycle of the periodic CSI, an offset, a reporting mode of the periodic CSI, uplink scheduling information used by the second access network device to schedule the terminal device, or a difference between a coding rate used by the periodic CSI and a coding rate used by uplink data, or the notification message is used to indicate at least one of a feedback cycle of the periodic CSI, an offset, a reporting mode of the periodic CSI, a location of a resource occupied for sending the periodic CSI by the terminal device, or the difference between the coding rate used by the periodic CSI and the coding rate used by the uplink data.

15. The access network device according to claim 14, wherein the difference between the coding rate used by the periodic CSI and the coding rate used by the uplink data comprises:

a difference between a coding rate used by a channel quality indicator CQI/precoding matrix indicator PMI of the periodic CSI and the coding rate used by the uplink data; or a difference between a coding rate used by a rank indication (RI) of the periodic CSI and the coding rate used by the uplink data.

16. The access network device according to claim 13, wherein the notification message is used to indicate at least one of a coding rate used by the aperiodic CSI, a reporting mode of the aperiodic CSI, or that a resource used for sending the aperiodic CSI by the terminal device is a resource indicated by downlink control information; or the notification message is used to indicate at least one of a coding rate used by the aperiodic CSI, a reporting mode of the aperiodic CSI, or that a resource used for sending the aperiodic CSI by the terminal device is a resource indicated by uplink grant information.

17. The access network device according to claim 16, wherein the coding rate used by the aperiodic CSI is the same as a coding rate used by uplink data.

18. An access network device, comprising:
a first transmitter configured to send request information to a terminal device by using a first cell, wherein the request information is used to request the terminal device to send channel state information (CSI) to the access network device, and the terminal device camps on the first cell;

a processor configured to determine condition information, wherein the terminal device sends the CSI based on the condition information; and a second transmitter configured to send a notification message to a first access network device associated with a second cell, wherein the notification message is used to indicate the condition information.

19. The access network device according to claim 18, wherein if the request information is used to request the terminal device to send periodic CSI to the access network device, the request information is carried in radio resource control signaling; or if the request information is used to request the terminal device to send aperiodic CSI to the access network device, the request information is carried in downlink control information, or the request information is carried in a random access response message.

20. The access network device according to claim 19, wherein the request information is used to request the terminal device to send the aperiodic CSI to the access network device; and if the request information is carried in the downlink control information, the notification message is used to indicate at least one of a coding rate used by the aperiodic CSI, a reporting mode of the aperiodic CSI, or that a resource used for sending the aperiodic CSI by the terminal device is a resource indicated by the downlink control information; or if the request information is carried in the random access response message, the notification message is used to indicate at least one of a coding rate used by the aperiodic CSI, a reporting mode of the aperiodic CSI, or that a resource used for sending the aperiodic CSI by the terminal device is a resource indicated by uplink grant information.

21. The access network device according to claim 20, wherein the coding rate used by the aperiodic CSI is the same as a coding rate used by uplink data.

22. The access network device according to claim 19, wherein the request information is used to request the terminal device to send the periodic CSI to the access network device; and if the terminal device sends the periodic CSI by using an uplink control channel, the notification message is used to indicate at least one of a feedback cycle of the periodic CSI, an offset, a reporting mode of the periodic CSI, or a location of a resource occupied for sending the periodic CSI by the terminal device; or if the terminal device sends the periodic CSI by using an uplink shared channel, the notification message is used to indicate at least one of a feedback cycle of the periodic CSI, an offset, a reporting mode of the periodic CSI, uplink scheduling information used by the access network device to schedule the terminal device, or a difference between a coding rate used by the periodic CSI and a coding rate used by uplink data, or the notification message is used to indicate at least one of a feedback cycle of the periodic CSI, an offset, a reporting mode of the periodic CSI, a location of a resource occupied for sending the periodic CSI by the terminal device, or a difference between the coding rate used by the periodic CSI and the coding rate used by the uplink data.

23. The access network device according to claim 22, wherein the difference between the coding rate used by the periodic CSI and the coding rate used by the uplink data comprises:

a difference between a coding rate used by a channel quality indicator (CQI) or a precoding matrix indicator (PMI) of the periodic CSI and the coding rate used by the uplink data; or a difference between a coding rate used by a rank indication (RI) of the periodic CSI and the coding rate used by the uplink data.

24. The access network device according to claim 18, wherein if a delay in sending any message by the access network device to the first access network device is greater than a first delay, the first transmitter sends the request information to the terminal device at a first moment, and the second transmitter sends the notification message to the first access network device at a second moment, wherein the second moment is earlier than the first moment, and the first delay is a delay between sending the request information by the access network device and sending the CSI by the terminal device; or if a delay in sending any message by the access network device to the first access network device is less than or equal to a first delay, the first transmitter sends the request information to the terminal device at a first moment, and the second transmitter sends the notification message to the first access network device at a second moment, wherein the second moment is equal to the first moment, and the first delay is a delay between sending the request information by the access network device and sending the CSI by the terminal device.

* * * * *